US012781827B2

(12) United States Patent
Kim et al.

(10) Patent No.: US 12,781,827 B2

(45) Date of Patent: Nov. 3, 2026

(54) PEDAL SIMULATOR FOR VEHICLE

(71) Applicant: HYUNDAI MOBIS CO., LTD., Seoul (KR)

(72) Inventors: Jin Hyun Kim, Yongin-si (KR); Myeon Gyu Cha, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 0 days.

(21) Appl. No.: 19/091,086

(22) Filed: Mar. 26, 2025

(65) Prior Publication Data

US 2026/0009446 A1 Jan. 8, 2026

(30) Foreign Application Priority Data

Jul. 5, 2024 (KR) ........................ 10-2024-0088921

(51) Int. Cl.
*F16F 9/48* (2006.01)
*G05G 5/03* (2008.04)

(52) U.S. Cl.
CPC ................. *F16F 9/48* (2013.01); *G05G 5/03* (2013.01); *F16F 2230/30* (2013.01); *F16F 2232/08* (2013.01); *F16F 2238/026* (2013.01)

(58) Field of Classification Search
None
See application file for complete search history.

(56) References Cited

U.S. PATENT DOCUMENTS

| | | | | |
|---|---|---|---|---|
| 6,240,801 | B1 * | 6/2001 | Kojima | G05G 1/38 267/155 |
| 10,913,440 | B2 | 2/2021 | Kim | |
| 10,948,941 | B2 * | 3/2021 | Dohmen | B60T 7/06 |
| 11,834,024 | B2 * | 12/2023 | Kim | B60T 7/06 |
| 2014/0138888 | A1 | 5/2014 | Kim | |

FOREIGN PATENT DOCUMENTS

KR 10-2223847 B1 2/2021

OTHER PUBLICATIONS

Extended European Search Report issued on Jun. 27, 2025 in the corresponding European Patent Application No. 25163142.0.

* cited by examiner

*Primary Examiner* — Vicky A Johnson

(74) *Attorney, Agent, or Firm* — Morgan, Lewis & Bockius LLP

(57) ABSTRACT

A pedal simulator includes a housing unit, a piston unit movably engaged in the housing unit, an elastic unit elastically supporting the piston unit in the housing unit, a damper unit coupled to the piston unit and selectively compressed by contact with the housing unit, and a friction unit coupled to the piston unit, slidably contacting the housing unit, and generating frictional force of different magnitudes depending on movement of the piston unit in a first direction or a second direction opposite to the first direction.

18 Claims, 11 Drawing Sheets

PEDAL SIMULATOR FOR VEHICLE

CROSS-REFERENCE TO RELATED APPLICATION

This application claims priority from and the benefit under 35 USC § 119 of Korean Patent Application No. 10-2024-0088921, filed on Jul. 5, 2024, in the Korean Intellectual Property Office, the entire invention of which is incorporated by reference for all purposes.

BACKGROUND

1. Technical Field

Exemplary embodiments of the present invention relate to a pedal simulator for a vehicle, and more particularly, to a pedal simulator for a vehicle, capable of providing feeling of braking.

2. Description of the Related Art

In general, a hydraulic system has been applied to a vehicle brake. Recently, with the emergence of electric brake devices (brake by wire system) and autonomous vehicle-related technologies, the development of non-hydraulic brake devices is being demanded.

An electronic pedal (e-pedal) or pedal simulator is a component mounted on an electric brake booster or an electro-mechanical brake and provides a driver with the feeling of braking generated by a conventional mechanical (hydraulic) brake.

The background technology of the present invention is disclosed in Korean Registration Patent Publication No. 10-2223847 (announced on Mar. 8, 2021, and entitled “Pedal simulator”).

SUMMARY

According to an aspect of the present invention, there is provided a pedal simulator for a vehicle, capable of providing feeling of braking.

According to another aspect of the present invention, there is provided a pedal simulator for a vehicle, which can be applied regardless of the type and shape of a pedal.

In a general aspect of the invention, a pedal simulator for a vehicle may include: a housing unit, a piston unit movably engaged in the housing unit, an elastic unit elastically supporting the piston unit in the housing unit, a damper unit coupled to the piston unit and selectively compressed by contact with the housing unit, and a friction unit coupled to the piston unit, slidably contacting the housing unit, and generating frictional force of different magnitudes depending on movement of the piston unit in a first direction or a second direction opposite to the first direction.

The friction unit may include a first friction part coupled to a first portion of the piston unit, and a second friction part disposed to be spaced apart from the first friction part and coupled to a second part of the piston unit.

The piston unit may include a piston body part disposed inside the housing unit and including a first seating groove in which the first friction part is seated, a piston rod part disposed on one side of the piston body part and including a second seating groove in which the second friction part is seated, and a piston pressurizing part disposed on the other side of the piston body part and coupled to the piston body part.

The housing unit may include a hollow part in which the piston unit is movably accommodated, a solid part provided on one side of the hollow part and selectively supporting the damper unit, the damper unit being compressed by movement of the piston unit in the first direction, and an insertion part disposed outside of the solid part and configured to communicate with the hollow part, the piston rod part being slidably inserted into the insertion part.

The friction unit may include a friction body part of an annular shape surrounding the piston unit and coupled to the piston unit, a seal cup part protruding from the friction body part and having an opening toward the second direction, and a seal lip part extending from the seal cup part in the second direction and slidably contacting an inner surface of the housing unit.

A plurality of seal lip parts may be disposed to be spaced apart from each other along a circumferential direction of the friction body part.

The friction unit may further include an airflow part disposed between the plurality of seal lip parts and not in contact with the inner surface of the housing unit, air flowing through the airflow part.

The housing unit may be further provided with a slit hole, and the pedal simulator may further include a retainer unit coupled to the housing unit by passing through the slit hole and interfering with the piston pressurizing part to prevent the piston unit from being detached from the housing unit.

Each of the damper unit and the friction unit may include an elastically deformable material.

A pedal simulator for a vehicle according to the present invention may include a housing unit detachably connected to a pedal unit, a piston unit movably engaged in the housing unit, an elastic unit elastically supporting the piston unit inside the housing unit, a damper unit coupled to the piston unit and selectively compressed by contact with the housing unit, and a friction unit coupled to the piston unit, slidably contacting the housing unit, and generating frictional force of different magnitudes depending on movement of the piston unit in a first direction or a second direction opposite to the first direction.

According to the present invention, a friction unit coupled to a piston unit and moved together with the piston unit and contacting a housing unit to generate a frictional force generates the frictional force of different magnitudes depending on the direction of movement of the piston unit. Accordingly, there is an effect of reducing driver fatigue when the driver maintains the operation of the brake for a long time by implementing hysteresis.

In addition, the present invention has an effect of preventing shaking of the piston unit and securing the straightness of the piston unit by absorbing the tolerance between the piston unit and the housing unit by a friction unit interposed between the piston unit and the housing unit.

In addition, the present invention has an effect of preventing noise and changes in operating feel when a piston unit moves by means of an airflow part formed in a friction unit.

In addition, the present invention has an effect of reducing the repair and replacement costs of the pedal simulator and improving productivity by enabling common use of various types of pedal units through modularization that can be applied regardless of the type and shape of the pedal unit.

Furthermore, the present invention has an effect of eliminating the pedal return spring by an elastic unit that elastically supports the piston unit.

DETAILED DESCRIPTION

Figure 1:
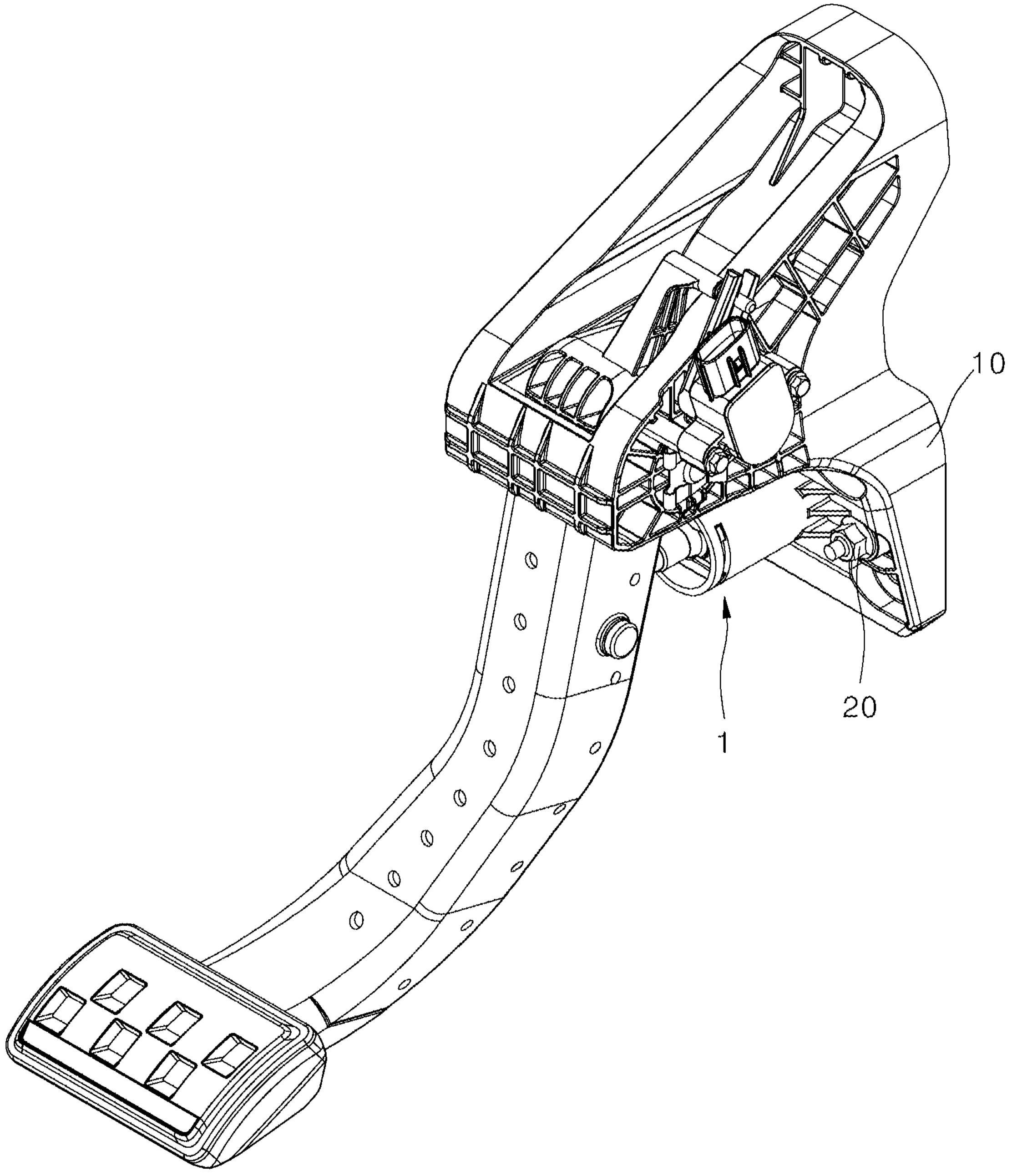
FIG. 1 is a perspective view illustrating a pedal simulator for a vehicle mounted on a pendant-type pedal unit, according to an embodiment of the present invention.

Hereinafter, a pedal simulator for a vehicle according to an embodiment of the present invention will be described below with reference to the accompanying drawings through various exemplary embodiments. In such a process, the thickness of a line or the size of an element illustrated in the drawings may have been exaggerated for the clarity of a description and for convenience' sake. Terms to be described below have been defined by taking into consideration their functions in the present invention, and may be different depending on a user or operator's intention or practice. Accordingly, such terms should be interpreted based on the overall contents of this specification.

FIG. 1 is a perspective view illustrating a pedal simulator for a vehicle mounted on a pendant-type pedal unit, according to an embodiment of the present invention.

Referring to FIG. 1, the pedal simulator 1 of a vehicle according to an embodiment of the present invention may be detachably mounted on a pedal unit 10, regardless of the type and shape of the pedal unit 10, such as a pendant-type pedal unit, an organ-type pedal unit, etc. Therefore, the pedal simulator 1 of a vehicle according to an embodiment of the present invention is modularized and can be easily assembled and mounted on the pedal unit 10, such as the pendant-type pedal unit and the organ-type pedal unit, enabling standardization.

The pedal simulator 1 of a vehicle according to an embodiment of the present invention has a bracket unit 140 provided on a housing unit 100, which is coupled to the pendant-type or organ-type pedal unit through coupling members 20 such as bolts and nuts, allowing for easy assembly.

Figure 2:
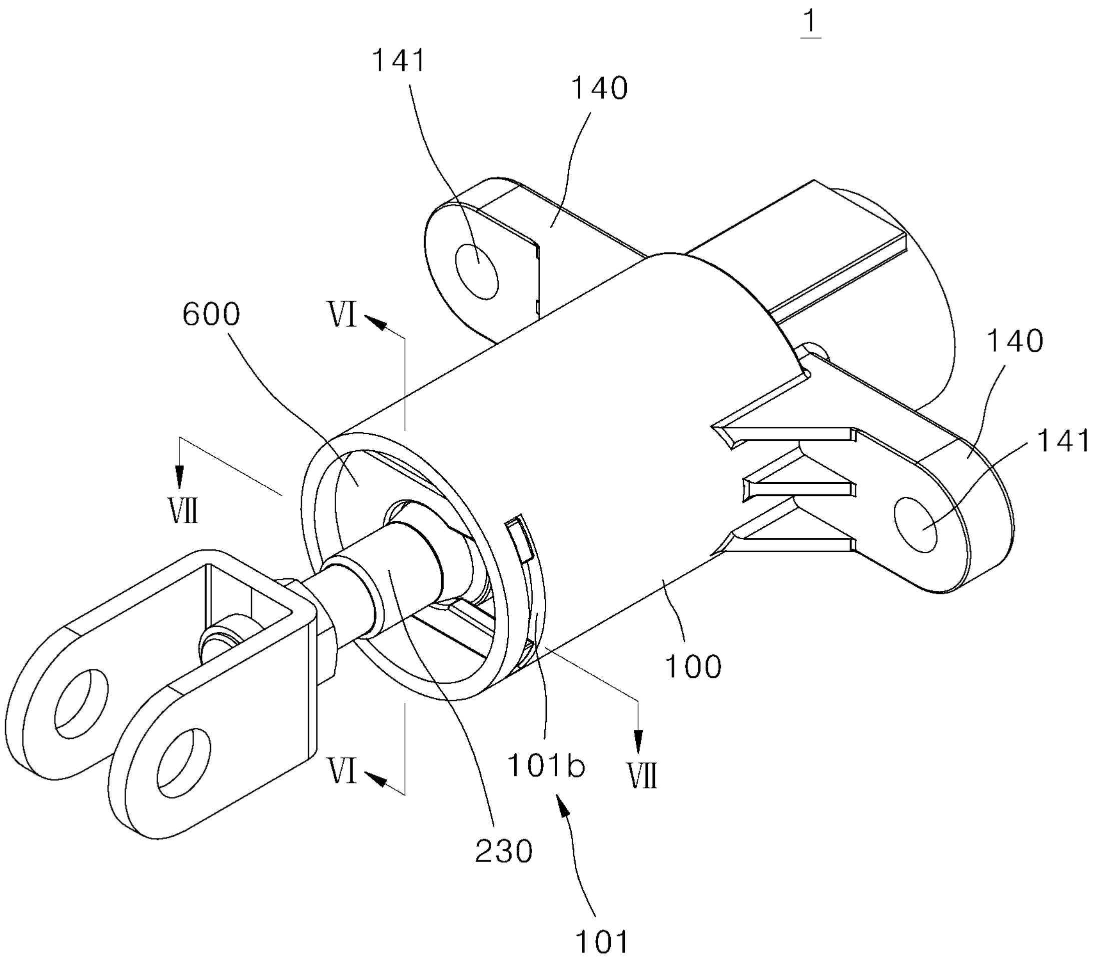
FIG. 2 is a perspective view illustrating a pedal simulator for a vehicle viewed from one direction, according to an embodiment of the present invention.
Figure 3:
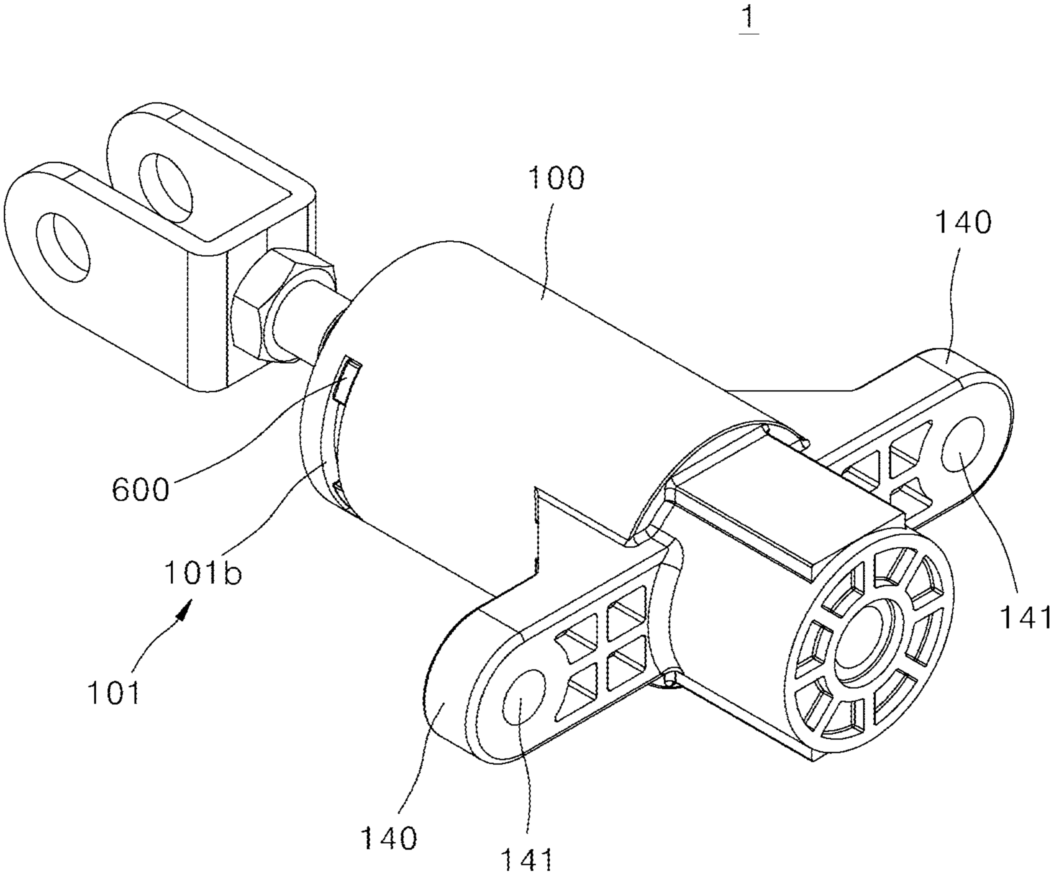
FIG. 3 is a perspective view illustrating a pedal simulator for a vehicle of FIG. 2 viewed from another direction.
Figure 4:
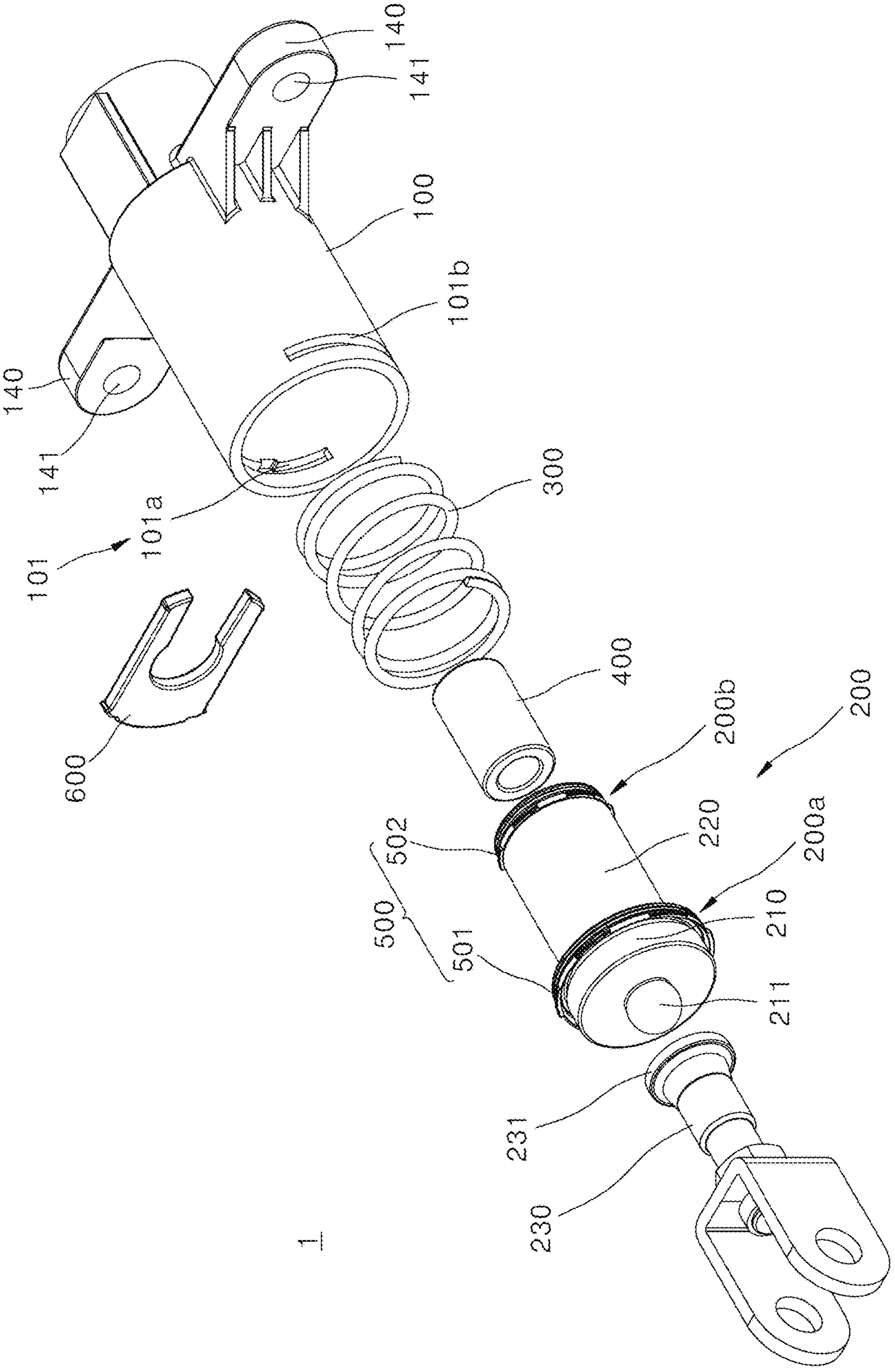
FIG. 4 is an exploded perspective view illustrating a pedal simulator for a vehicle viewed from one direction, according to an embodiment of the present invention.
Figure 5:
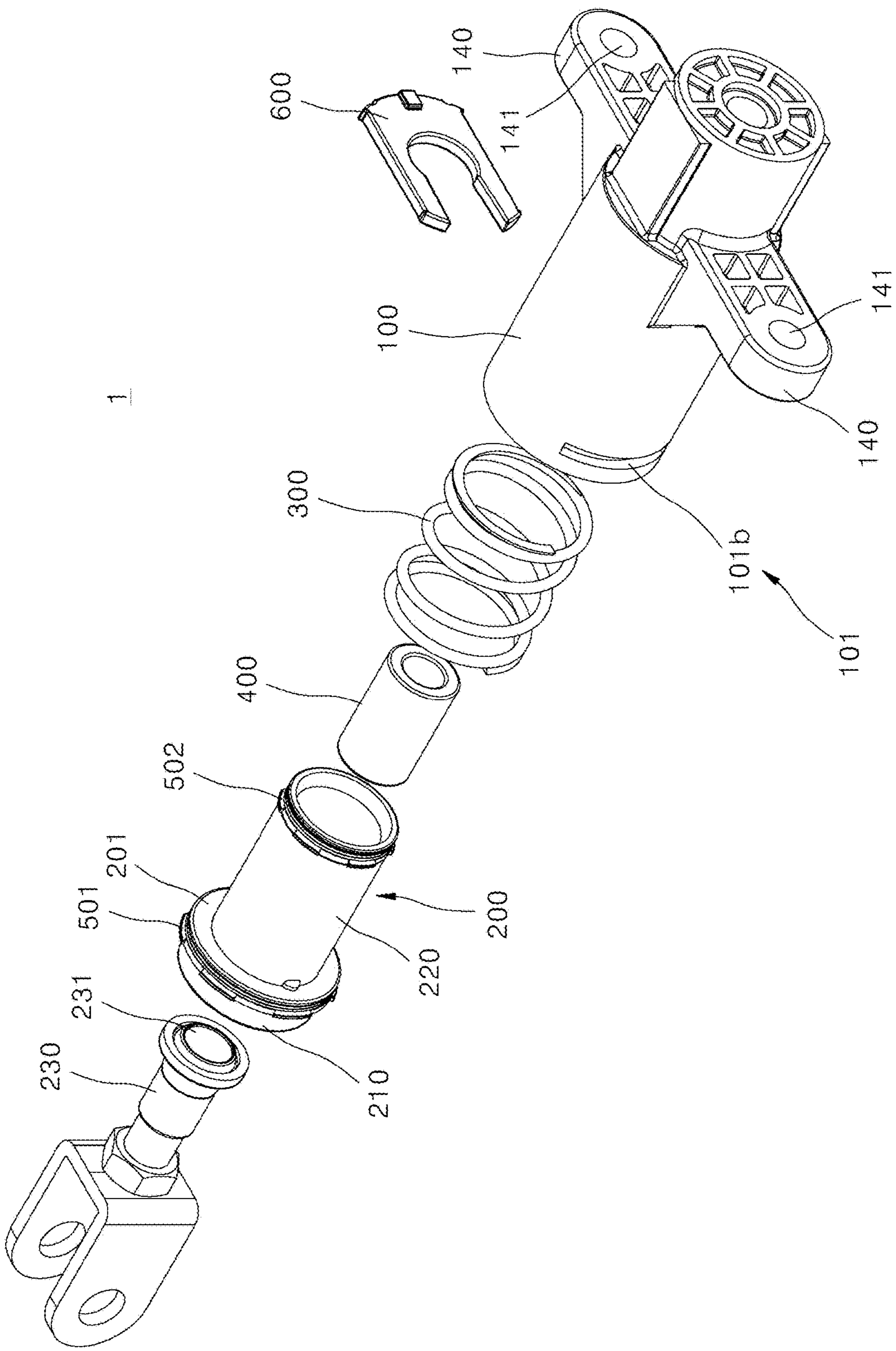
FIG. 5 is an exploded perspective view illustrating the pedal simulator for a vehicle of FIG. 4 from another direction.
Figure 6:
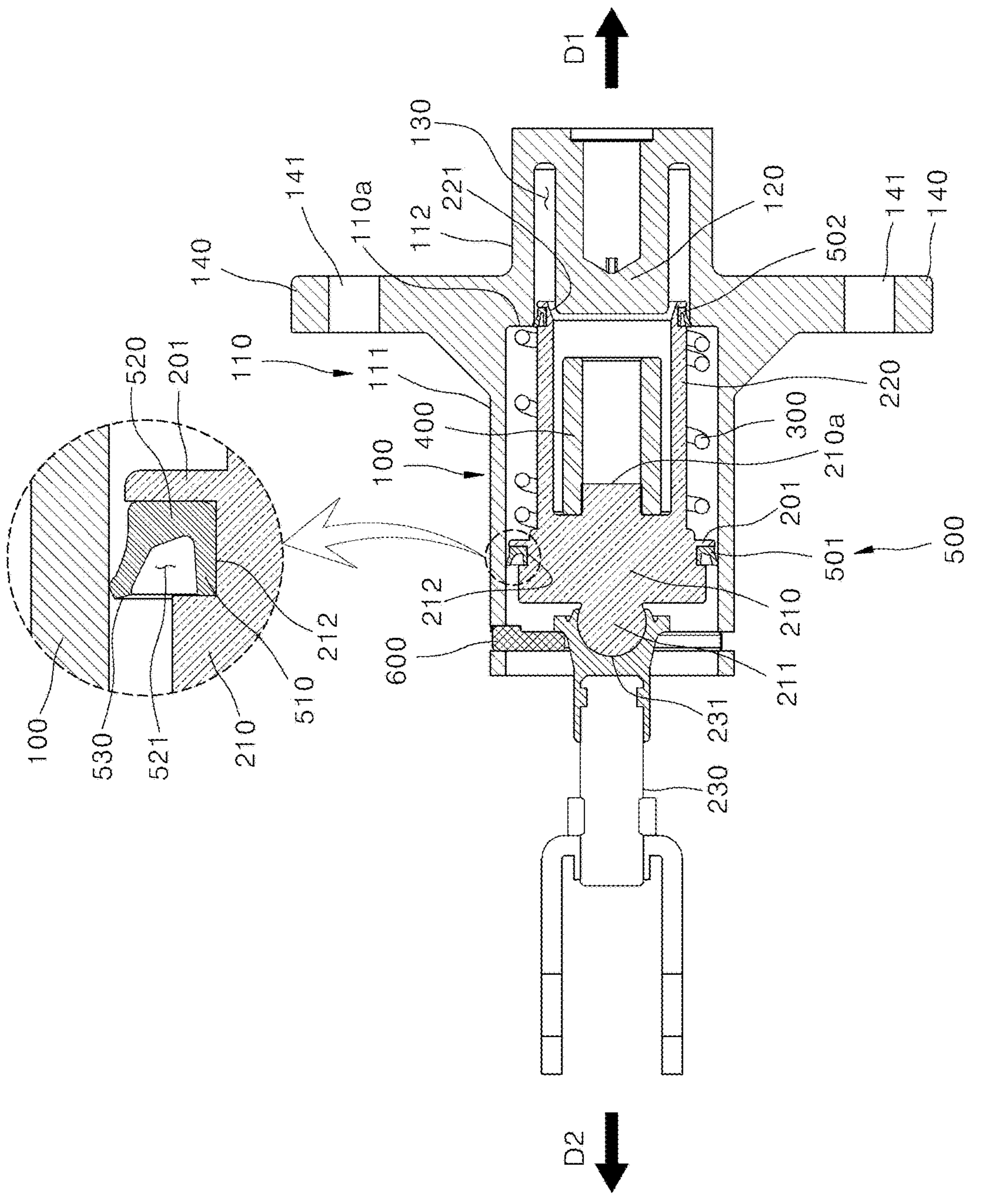
FIG. 6 is a cross-sectional view taken along line VI-VI of FIG. 2.

FIG. 2 is a perspective view of a pedal simulator for a vehicle viewed from one direction, according to an embodiment of the present invention. FIG. 3 is a perspective view of a pedal simulator for a vehicle of FIG. 2 viewed from another direction. FIG. 4 is an exploded perspective view of the pedal simulator for a vehicle viewed from one direction, according to an embodiment of the present invention. FIG. 5 is an exploded perspective view of the pedal simulator of the vehicle of FIG. 4 from another direction. FIG. 6 is a cross-sectional view taken along line VI-VI of FIG. 2.

Referring to FIG. 2 to FIG. 6, the pedal simulator 1 of a vehicle according to an embodiment of the present invention includes the housing unit 100, a piston unit 200, an elastic unit 300, a damper unit 400, and a friction unit 500, which are described in more detail as follows.

The housing unit 100 forms the overall appearance of the pedal simulator 1 of a vehicle according to the present embodiment, and can support the piston unit 200, the elastic unit 300, the damper unit 400, the friction unit 500, etc. The housing unit 100 includes a hollow part 110, a solid part 120, and an insertion part 130.

The hollow part 110 is provided inside of the housing unit 100 and formed in a hollow shape having a set length. The piston unit 200 may be movably accommodated in the hollow part 110.

A through hole communicating with the hollow part 110 may be formed in an outer side (left side in FIG. 6) of the housing unit 100. The hollow part 110 may be formed as a cylindrical groove.

The hollow part 110 may include a first hollow portion 111 and a second hollow portion 112 having an inner diameter smaller than the inner diameter of the first hollow portion 111. A step part **110*a* may be formed between the first hollow portion 111 and the second hollow portion 112 and bent toward the center of the housing unit 100. The elastic unit 300 may be seated in the step part 110*a***.

The solid part 120 is provided inside the housing unit 100 and may be provided on one side (right side in FIG. 6) of the hollow part 110. The solid part 120 may be formed in a solid shape having a set length.

The solid part 120 may be located inside the second hollow portion 112. The outer diameter of the solid part 120 may be smaller than the inner diameter of the second hollow portion 112. The solid part 120 may support the damper unit 400 such that the damper unit 400 is compressed by the pressure of the piston unit 200 according to the movement of the piston unit 200 in a first direction D1 (right direction in FIG. 6).

The insertion part 130 may be provided on the inside of the housing unit 100 and on the outside of the solid part 120. The insertion part 130 may be formed between the inner surface of the second hollow portion 112 and the outer surface of the solid part 120. The insertion part 130 may be formed along the circumferential direction of the second hollow portion 112 and the solid part 120.

The insertion part 130 may communicate with the first hollow portion 111. A piston rod part 220 described later may be inserted into the insertion part 130.

The housing unit 100 may be detachably connected to the pedal unit 10, such as the pendant-type pedal unit, the organ-type pedal unit, etc. The housing unit 100 may be provided with a bracket unit 140 connected to the pedal unit 10. The bracket unit 140 may be disposed protruding on the outer surface of the housing unit 100. A plurality of bracket units 140 may be disposed in a spaced manner on the housing unit 100.

The bracket unit 140 may be provided with hole portions 141. The hole portions 141 may be disposed to penetrate through the bracket unit 140 in a thickness direction. The bracket unit 140 is coupled to a coupling hole formed in the pedal unit 10 by means of the coupling members 20 such as bolts or nuts, thereby maintaining a stable connection between the housing unit 100 and the pedal unit 10, and preventing the rotation of the housing unit 100.

The piston unit 200 may be movably disposed in the housing unit 100. The piston unit 200 may be moved in the first direction D1 (rightward direction in FIG. 6) along a longitudinal direction of the housing unit 100, or may be moved in a second direction D2 (leftward direction in FIG. 6) opposite to the first direction D1.

The piston unit 200 includes a piston body part 210, a piston rod part 220, and a piston pressurizing part 230.

The piston body part 210 may be located inside the housing unit 100. The piston body part 210 may be accommodated in the hollow part 110 of the housing unit 100. The piston body part 210 may be movably accommodated in the first hollow portion 111. The piston body part 210 may be formed in a plate shape having a set thickness. A gap may be formed between the inner surface of the first hollow portion 111 and the outer surface of the piston body part 210.

The piston body part 210 may be provided with a spherical ball portion 211. The ball portion 211 may be formed to protrude on the outer surface of the piston body part 210 facing the direction in which a piston pressurizing part 230 is located. In detail, the ball portion 211 may protrude from the piston body part 210 in the second direction D2. A socket portion 231 of the piston pressurizing part 230 may be coupled to the ball portion 211.

The piston body part 210 may be provided with a protrusion 210*a*. The protrusion 210*a* may be formed to protrude on the outer surface of the piston body part 210 facing the direction in which the solid part 120 is located. In detail, the protrusion 210*a* may protrude from the piston body part 210 in the first direction D1. The protrusion 210*a* may be located at the center of the piston body part 210. The damper unit 400 may be forcefully fitted to the protrusion 210*a*.

The piston body part 210 may be provided with a first seating groove 212. The first seating groove 212 may be recessed into the outer surface of the piston body part 210 and formed along the circumferential direction of the piston body part 210. A first friction part 501 to be described later may be seated in the first seating groove 212.

The piston rod part 220 may be provided at one side (right side in FIG. 6) of the piston body part 210. The piston rod part 220 may be formed on the outer surface of the piston body part 210 facing the direction in which the solid part 120 is located. In detail, the piston rod part 220 may be formed to extend from the piston body part 210 in the first direction D1.

The piston rod part 220 may be movably accommodated in the hollow part 110. The piston rod part 220 may be movably accommodated in the first hollow portion 111, and may be inserted into the insertion part 130 according to the movement in the first direction D1 to be movably accommodated in the second hollow portion 112.

The outer diameter of the piston rod part 220 may be smaller than the outer diameter of the piston body part 210. A gap may be formed between the inner surface of the second hollow portion 112 and the outer surface of the piston rod part 220.

The piston rod part 220 may have an opening at one end (right side in FIG. 6) facing the direction where the solid portion 120 is located, and may be formed in a hollow shape. The piston rod part 220 may be formed in a cylindrical shape having a set length. The damper unit 400 may be mounted on the piston rod part 220.

The piston rod part 220 may be provided with a second seating groove 221. The second seating groove 221 may be recessed into the outer surface of the piston rod part 220 and formed along the circumferential direction of the piston rod part 220. The second seating groove 221 may be formed at the free end of the piston rod part 220. A second friction part 502 described below may be seated in the second seating groove 221.

The piston pressurizing part 230 may be mounted on the piston body part 210. In detail, the piston pressurizing part 230 may be mounted on the ball portion 211. The piston pressurizing part 230 may be exposed through a through hole of the housing unit 100. When an external force is applied, the piston pressurizing part 230 may move in the first direction D1 (right direction in FIG. 6).

The piston pressurizing part 230 may be rotatably coupled to the piston body part 210 in a joint manner. In detail, the socket part 231 provided in the piston pressurizing part 230 may be rotatably coupled to the ball portion 211 provided in the piston body part 210.

The piston body part 210 may be caulked to the piston pressurizing part 230. For example, by caulking by pressing the opening of the socket part 231 toward the piston body part 210, the piston pressurizing part 230 moved by an external force can be maintained in a state of being rotatably coupled to the ball portion 211. The piston body part 210 may be caulked to the piston pressurizing part 230, thereby reducing assembly time and cost.

The piston unit 200 may be provided with a protrusion 201. The protrusion 201 may be disposed on the outer surface of the piston unit 200. The protrusion 201 may protrude in the radial direction of the piston unit 200, and may be disposed along the circumferential direction of the piston unit 200.

The protrusion 201 may be provided on the piston body part 210. In detail, the protrusion 201 may be located between the piston body part 210 and the piston rod part 220. The elastic unit 300 may be seated on the protrusion 201.

The elastic unit 300 may elastically support the piston unit 200 on the inside of the housing unit 100. The elastic unit 300 may elastically support the piston unit 200 in the hollow part 110.

One side (right side in FIG. 6) of the elastic unit 300 may be in contact with the inner surface of the first hollow portion 111, and the other side (left side in FIG. 6) may be in contact with the outer surface of the piston body part 210. In detail, one side of the elastic unit 300 may be seated on the step part 110*a*, and the other side of the elastic unit 300 may be seated on the protrusion 201.

The elastic unit 300 can provide elastic force to the piston body part 210 that moves in the first direction D1 by an external force applied to the piston pressurizing part 230.

The elastic unit 300 may be compressed by the piston body part 210 that moves in the first direction D1 by an external force applied to the piston pressurizing part 230 between the protrusion 201 and the step part 110*a*.

The compressed elastic unit 300 can provide elastic force (elastic restoring force) to the protrusion 201 in the second direction D2 to return the piston body part 210 to the original position. The elastic unit 300 may include a coil spring that surrounds the circumference of the piston rod part 220.

The damper unit 400 may be provided in the piston unit 200. The damper unit 400 may be accommodated in the piston rod part 220. A gap may be formed between the inner surface of the piston rod part 220 and the outer surface of the damper unit 400. The damper unit 400 may be coupled to the inside of the piston rod part 220 through the opening of the piston rod part 220.

The damper unit 400 may include an elastically deformable material. The damper unit 400 may include rubber, silicone, plastic, etc. as the elastically deformable material.

The damper unit 400 may be formed in a hollow shape. Openings communicating with the inner space of the damper unit 400 may be provided at both ends of the damper unit 400. The protrusion 210*a* formed to protrude from the outer surface of the piston body part 210 may be pressed into one opening of the damper unit 400, so that the damper unit 400 can be fixed to inside of the piston rod part 220.

The ends of the damper unit 400 may be exposed or not exposed through the openings of the piston rod part 220 in the piston rod part 220.

The damper unit 400 moves together with the piston unit 200 and may be elastically deformed according to the movement of the piston unit 200. The damper unit 400 may be supported and compressed on the solid part 120 according to the movement of the piston unit 200 in the first direction D1.

When the piston rod part 220 moves in the first direction D1 toward the solid part 120 by an external force applied to the piston pressurizing part 230, the damper unit 400 may be supported by the solid part 120, and when the piston rod part 220 is inserted into the insertion part 130, the damper unit 400 may be compressed between the protrusion 201 and the solid part 120.

Figure 7:
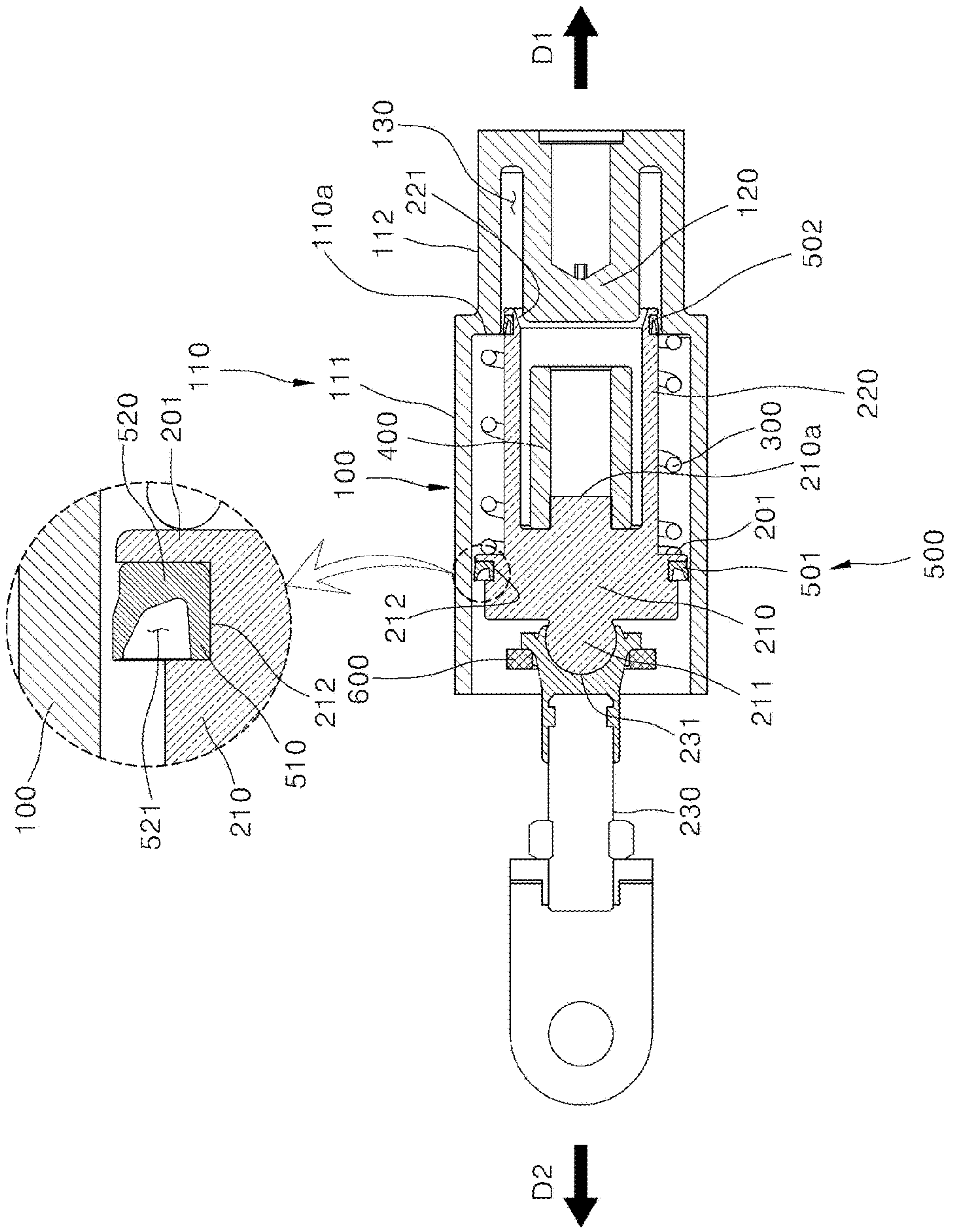
FIG. 7 is a cross-sectional view taken along line VII-VII of FIG. 2.
Figure 8:
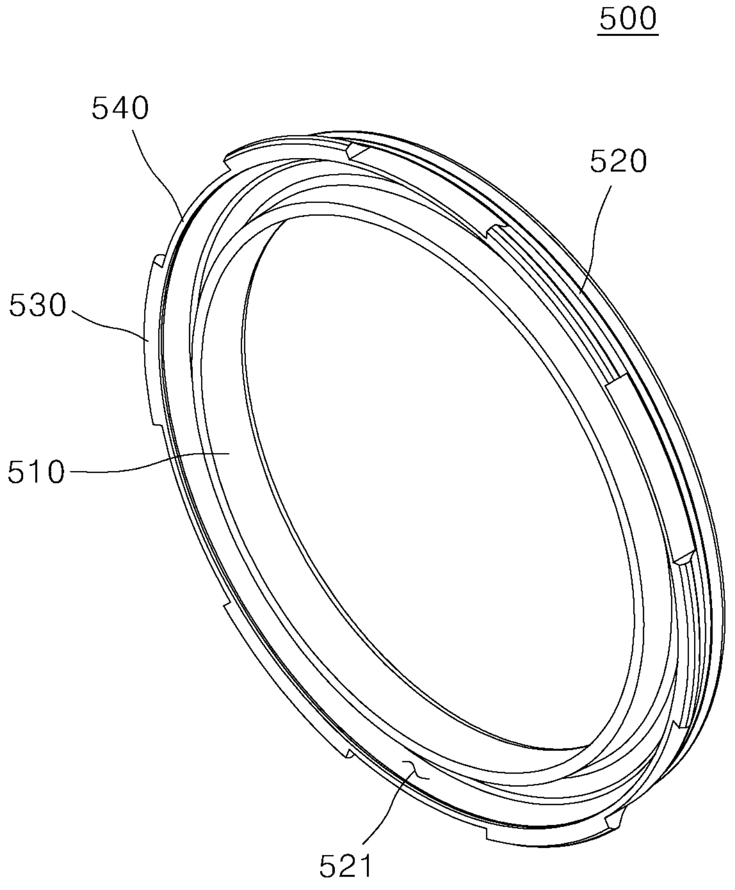
FIG. 8 is a perspective view illustrating a friction unit according to an embodiment of the present invention.
Figure 9:
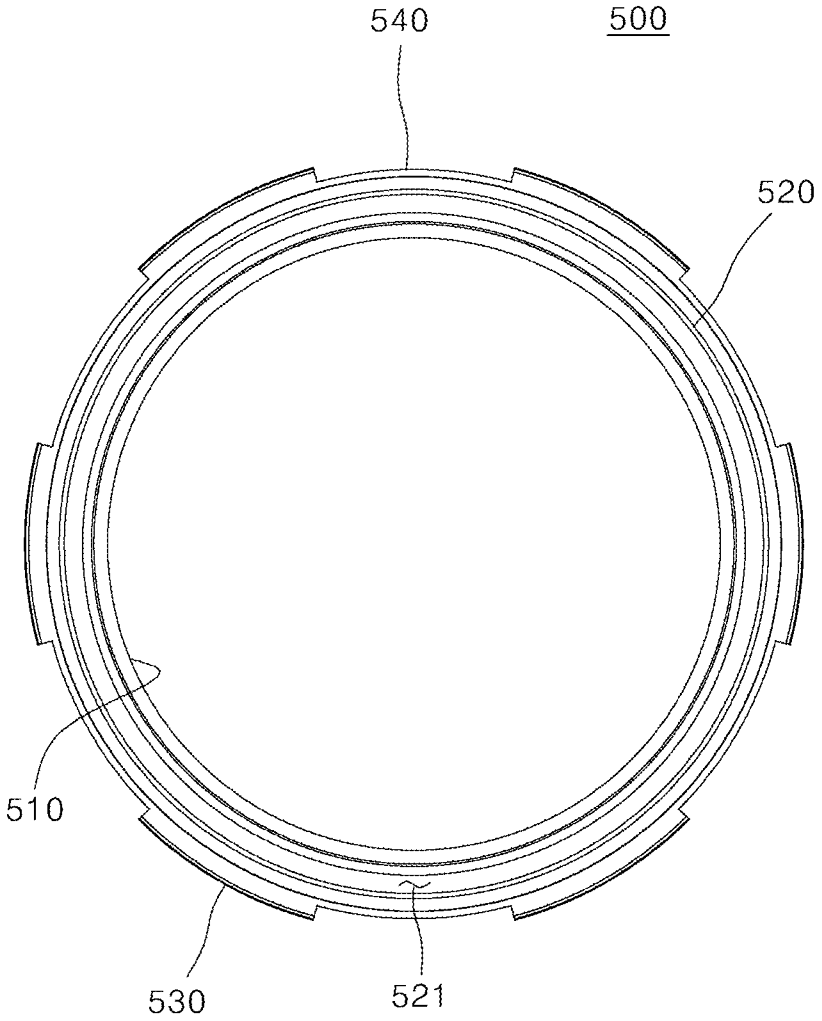
FIG. 9 is a front view of FIG. 8.

FIG. 7 is a cross-sectional view taken along line VII-VII of FIG. 2, FIG. 8 is a perspective view illustrating a friction unit according to an embodiment of the present invention, and FIG. 9 is a front view of FIG. 8.

Referring to FIG. 2 to FIG. 9, the friction unit 500 may be coupled to the piston unit 200. The friction unit 500 may be coupled to the piston unit 200 in a manner in which the friction unit 500 surrounds the outer surface of the piston unit 200. The friction unit 500 may move together with the piston unit 200. The friction unit 500 may include an elastically deformable material. The friction unit 500 may include rubber, silicone, plastic, etc. as the elastically deformable material.

The friction unit 500 may be in contact with the housing unit 100. The friction unit 500 may be in contact with the inner surface of the housing unit 100. The friction unit 500 can guide the linear movement of the piston unit 200. The friction unit 500 may generate a frictional force having a different magnitude depending on movement of the piston unit 200 in the first direction D1 or the second direction D2.

The friction unit 500 may include a friction body part 510, a seal cup part 520, a seal lip part 530, and an airflow part 540.

The friction body part 510 may be formed in an annular shape that surrounds the piston unit 200. The friction body part 510 may be in close contact with the outer surface of the piston unit 200.

The seal cup part 520 may protrude on the outer surface of the friction body part 510. The seal cup part 520 may protrude from the friction body part 510 in a radial direction of the friction body part 510. The seal cup part 520 may be provided with an opening 521. The opening 521 may be opened toward the second direction D2. The seal cup part 520 may have a cross section that is approximately in a shape of letter "U". The seal cup part 520 may not come into contact with the inner surface of the housing unit 100.

The seal lip part 530 may be provided at the seal cup part 520. The seal lip part 530 may extend from the seal cup part 520. The seal lip part 530 may extend in the second direction D2 from a free end of the seal cup part 520 and extend obliquely in a radial direction of the friction body part 510.

The seal lip part 530 may be in contact with the housing unit 100. The seal lip part 530 may be in close contact with the inner surface of the housing unit 100. A plurality of seal lip parts 530 may be arranged to be spaced apart from each other along a circumferential direction of the friction body part 510.

The seal cup part 520 has a shape that opens in the second direction, and the seal lip part 530 is in close contact with the inner surface of the housing unit 100. Accordingly, when the piston unit 200 moves in the first direction D1, the frictional force is generated as the seal cup part 520 is pressed between the piston unit 200 and the housing unit 100.

However, when the piston unit 200 moves in the second direction D2, because the frictional force is generated in the opening direction of the seal cup part 520, a greater frictional force is generated when the piston unit 200 moves in the second direction D2 than when the piston unit 200 moves in the first direction D1. This difference in frictional force enables hysteresis to be implemented.

The airflow part 540 may be disposed between the plurality of seal lip parts 530. The airflow part 540 may serve as a passage through which air flows without contacting the inner surface of the housing unit 100. When the piston unit 200 moves in the first direction D1 or the second direction D2, air inside the housing unit 100 may flow through the airflow part 540.

A plurality of friction units 500 may be provided. The friction unit 500 may include a first friction part 501 and a second friction part 502.

The first friction part 501 may be coupled to a first portion 200*a* of the piston unit 200. The first portion 200*a* may refer to the piston body part 210 of the piston unit 200. The first friction part 501 may be seated in the first seating groove 212 formed in the piston body part 210.

The outer diameter of the first friction part 501 seated in the first seating groove 212 may be larger than the outer diameter of the piston body part 210 and larger than the inner diameter of the first hollow portion 111, so that the first friction part 501 may be compressed between the outer surface of the piston body part 210 and the inner surface of the first hollow portion 111.

The second friction part 502 may be disposed to be spaced apart from the first friction part 501. The second friction part 502 may be coupled to the second portion 200*b* of the piston unit 200. The second portion 200*b* may refer to the piston rod part 220 of the piston unit 200. The second friction part 502 may be seated in the second seating groove 221 formed in the piston rod part 220.

The outer diameter of the second friction part 502 seated in the second seating groove 221 may be larger than the outer diameter of the piston rod part 220 and larger than the inner diameter of the second hollow portion 112, so that the second friction part 502 may be compressed between the outer surface of the piston rod part 220 and the inner surface of the second hollow portion 112.

The pedal simulator 1 of a vehicle according to the embodiment of the present invention may further include a retainer unit 600.

The housing unit 100 may be provided with a slit hole 101. The slit hole 101 may be formed to penetrate the outer surface of the housing unit 100. The slit hole 101 may include a first slit hole 101*a* and a second slit hole 101*b* located on an opposite side of the first slit hole 101*a*.

The retainer unit 600 may be formed in an annular shape with one side open. The retainer unit 600 may pass through the first slit hole 101*a* and a free end of the retainer unit 600 may be inserted into the second slit hole 101*b*, so that the retainer unit 600 may be coupled to the housing unit 100.

The retainer unit 600 may interfere with the piston pressurizing part 230 to prevent the piston unit 200 from being detached from the housing unit 100 through the through hole of the housing unit 100.

The operation process of the vehicle pedal simulator according to the embodiment of the present invention having the above-described configuration is described as follows.

Figure 10:
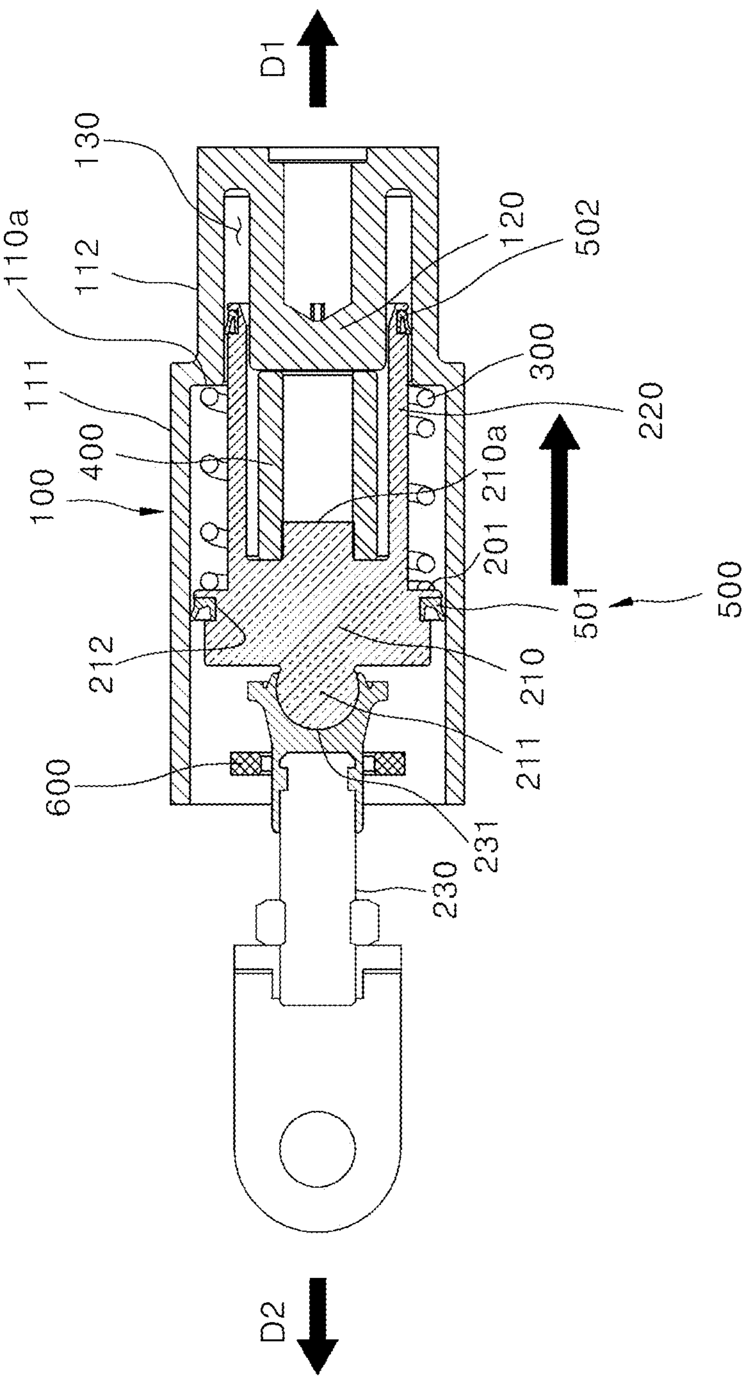
FIG. 10 is a cross-sectional view illustrating an operating state of initial braking of a pedal simulator for a vehicle according to an embodiment of the present invention.
Figure 11:
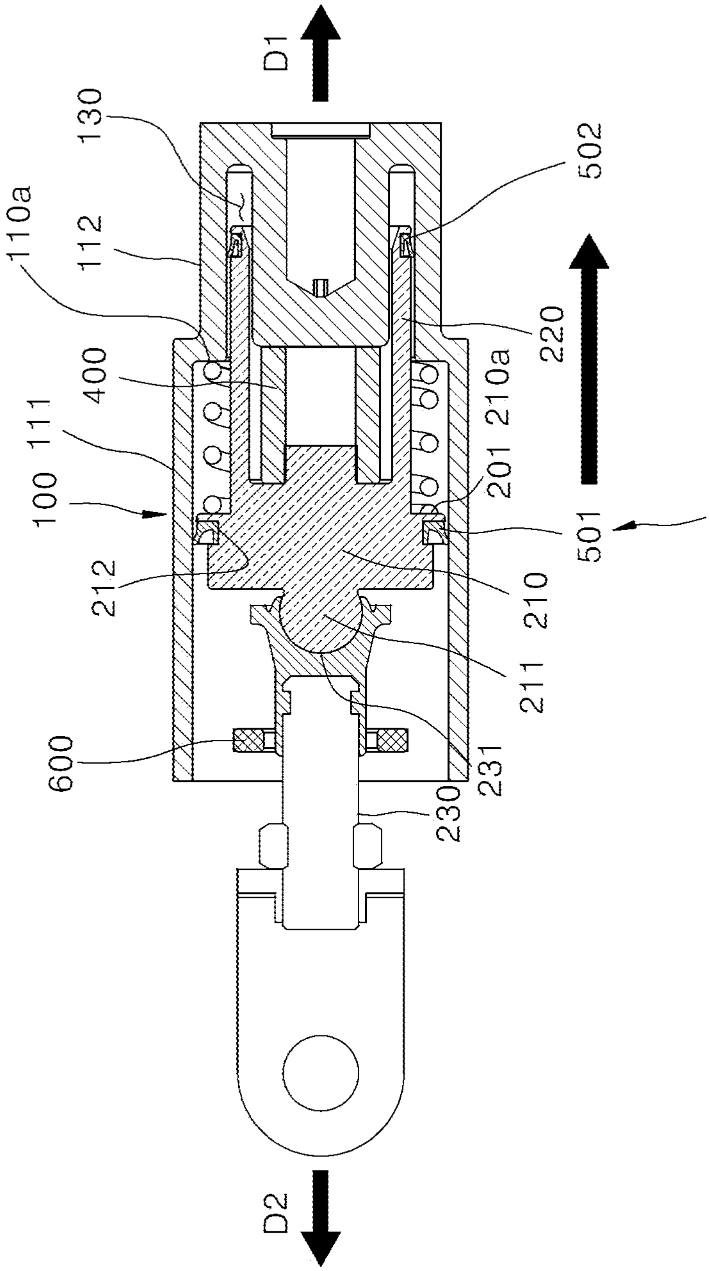
FIG. 11 is a cross-sectional view illustrating an operating state of intermediate and late braking of a pedal simulator for a vehicle according to an embodiment of the present invention.

FIG. 10 is a cross-sectional view illustrating an operating state of an initial braking of a pedal simulator for a vehicle according to an embodiment of the present invention. FIG. 11 is a cross-sectional view illustrating an operating state of an intermediate and late braking of the pedal simulator for a vehicle according to the embodiment of the present invention.

Referring to FIG. 10, when the piston pressurizing part 230 is pressurized by an external force, the piston rod part 220 moves in the first direction D1 together with the piston body part 210. As the piston body part 210 moves in the first direction D1, the elastic unit 300 is compressed and deformed by the pressurization of the protrusion, and the damper unit comes into contact with the solid part. When the elastic unit 300 is compressed, a user can feel an initial feeling of braking.

Referring to FIG. 11, as the external force continues to be applied to the piston pressurizing part 230, the elastic unit 300 is further compressed, and the piston rod part 220 is inserted into the insertion part. At the same time, the damper unit 400, which moves together with the piston rod part 220, is compressed while being supported by the solid part 120. When the elastic unit 300 and the damper unit 400 are compressed together, the user can feel an intermediate and late feeling of braking.

When the external force applied to the piston pressurizing part 230 is released, the compressed elastic unit 300 provides an elastic force (elastic restoring force) to the protrusion in the second direction D2 to return the piston body part 210 to an original position.

According to the pedal simulator 1 of a vehicle according to an embodiment of the present invention, the friction unit 500, which is coupled to the piston unit 200 and moves with the piston unit 200, and is in contact with the housing unit 100 to generate a friction force of a different magnitude depending on the moving direction of the piston unit 200. Therefore, the hysteresis can be realized, and thus, fatigue of a driver can be reduced when the driver maintains the operation of the brake for a long time.

According to the pedal simulator 1 of a vehicle according to an embodiment of the present invention, the tolerance between the piston unit 200 and the housing unit 100 is absorbed by the friction unit 500 interposed between the piston unit 200 and the housing unit 100, thereby preventing shaking of the piston unit 200 and ensuring the straightness of the piston unit 200.

According to the pedal simulator 1 of a vehicle according to an embodiment of the present invention, noise and changes in operating feel can be prevented when the piston unit 200 moves by the airflow part 540 formed in the friction unit 500.

According to the pedal simulator 1 of a vehicle according to an embodiment of the present invention, the repair and replacement costs of the pedal simulator 1 can be reduced and productivity can be improved by enabling common use of various types of pedal units through modularization that can be applied regardless of the type and shape of the pedal unit.

Furthermore, according to the pedal simulator 1 of a vehicle according to an embodiment of the present invention, a pedal return spring can be deleted by the elastic unit 300 that elastically supports the piston unit 200.

Although the present disclosure has been described with reference to the embodiments shown in the drawings, these are merely exemplary, and those skilled in the art will appreciate that various modifications and other equivalent embodiments can be made from these embodiments disclosed herein. Thus, the true technical scope of the disclosure should be defined by the following claims.

What is claimed is:

1. A pedal simulator apparatus for a vehicle, the pedal simulator apparatus comprising:
- a housing unit;
- a piston unit movably engaged in the housing unit;
- an elastic unit elastically supporting the piston unit in the housing unit;
- a damper unit coupled to the piston unit and selectively compressed by contact with the housing unit; and
- at least one friction unit coupled to the piston unit, slidably contacting the housing unit, and generating frictional force of different magnitudes depending on movement of the piston unit in a first direction or a second direction opposite to the first direction,
- wherein the at least one friction unit includes:
  - a first friction part coupled to a first portion of the piston unit and slidably contacting the housing unit; and
  - a second friction part disposed to be spaced apart from the first friction part, coupled to a second portion of the piston unit and slidably contacting the housing unit.

2. The pedal simulator apparatus of claim 1, wherein the piston unit includes a protrusion supporting the at least one friction unit in the second direction.

3. The pedal simulator apparatus of claim 1, wherein the piston unit includes:
- a piston body part disposed inside the housing unit and including a first seating groove in which the first friction part is seated;
- a piston rod part disposed on a first side of the piston body part and including a second seating groove in which the second friction part is seated; and
- a piston pressurizing part disposed on a second side of the piston body part and coupled to the piston body part.

4. The pedal simulator apparatus of claim 3, wherein the elastic unit is disposed between an inner surface of the housing unit and an outer surface of the piston rod part and elastically supports the piston unit and the housing unit.

5. The pedal simulator apparatus of claim 3, wherein a first end portion of the damping unit is coupled to the piston rod part and a second end portion of the damping unit is a free end so that the second end portion of the damping unit selectively contacts with the housing unit according to the movement of the piston unit.

6. The pedal simulator apparatus of claim 5, wherein the housing unit includes an insertion part and an end portion of the piston rod part is slidably inserted into the insertion part, the end portion of the piston rod part including the second seating groove in which the second friction part is seated.

7. The pedal simulator apparatus of claim 6, wherein the housing unit further includes:

a hollow part in which the piston unit is movably accommodated;

a solid part disposed on one side of the hollow part and selectively supporting the damper unit according to the movement of the piston unit, the damper unit being selectively compressed by the movement of the piston unit in the first direction; and the insertion part disposed outside of the solid portion art in the housing unit and fluidically communicating with the hollow part.

8. The pedal simulator apparatus of claim 7, wherein each friction unit includes:

a friction body part of an annular shape surrounding the piston body part and coupled to the piston body part;

a seal cup part protruding from the friction body part and having an opening toward the second direction; and a seal lip part extending from the seal cup part in the second direction and slidably contacting an inner surface of the housing unit.

9. The pedal simulator apparatus of claim 8, wherein the piston unit includes a protrusion protruding from the piston body part and supporting the seal cup part in the second direction.

10. The pedal simulator apparatus of claim 8, wherein a plurality of seal lip parts are disposed to be spaced apart from each other along a circumferential direction of the friction body part.

11. The pedal simulator apparatus of claim 10, wherein each friction unit further includes an airflow part disposed between the plurality of seal lip parts along the circumferential direction of the friction body part and not in contact with the inner surface of the housing unit, air flowing through the airflow part.

12. The pedal simulator apparatus of claim 3, further including a retainer unit, wherein the housing unit further includes a slit hole, and wherein the retainer unit is coupled to the housing unit by passing through the slit hole and interfering with the piston pressurizing part to prevent the piston unit from being detached from the housing unit.

13. The pedal simulator apparatus of claim 1, wherein each of the damper unit and the at least one friction unit include an elastically deformable material.

14. A pedal simulator apparatus for a vehicle, the pedal simulator apparatus comprising:

a housing unit detachably connected to a pedal unit;

a piston unit movably engaged in the housing unit;

an elastic unit elastically supporting the piston unit inside the housing unit;

a damper unit coupled to the piston unit and selectively compressed by contact with the housing unit; and at least one friction unit coupled to the piston unit, slidably contacting the housing unit, and generating frictional force of different magnitudes depending on movement of the piston unit in a first direction or a second direction opposite to the first direction, wherein each friction unit includes:

a friction body part of an annular shape surrounding the piston unit and coupled to the piston unit;

a seal cup part protruding from the friction body part and having an opening toward the second direction; and a seal lip part extending from the seal cup part in the second direction and slidably contacting an inner surface of the housing unit.

15. The pedal simulator apparatus of claim 14, wherein the piston unit includes a protrusion supporting the at least one friction unit in the second direction.

16. The pedal simulator apparatus of claim 14, wherein the piston unit includes a piston body part and a protrusion protruding from the piston body part, and wherein the protrusion supports the seal cup part in the second direction.

17. The pedal simulator apparatus of claim 14, wherein a plurality of seal lip parts are disposed to be spaced apart from each other along a circumferential direction of the friction body part.

18. The pedal simulator apparatus of claim 17, wherein each friction unit further includes an airflow part disposed between the plurality of seal lip parts and not in contact with the inner surface of the housing unit, air flowing through the airflow part.

* * * * *